Nov. 22, 1966         P. W. POST         3,286,516

APPARATUS FOR PERFORMING FLEXURE TESTS

Filed May 13, 1963         4 Sheets-Sheet 1

Paul W. Post

Nov. 22, 1966    P. W. POST    3,286,516
APPARATUS FOR PERFORMING FLEXURE TESTS
Filed May 13, 1963    4 Sheets-Sheet 2

Paul W. Post

Nov. 22, 1966 P. W. POST 3,286,516
APPARATUS FOR PERFORMING FLEXURE TESTS
Filed May 13, 1963 4 Sheets-Sheet 4

Paul W. Post

3,286,516
APPARATUS FOR PERFORMING FLEXURE TESTS
Paul W. Post, P.O. Box 279, Tacoma, Wash.
Filed May 13, 1963, Ser. No. 279,773
6 Claims. (Cl. 73—100)

This invention relates to a device and method for performing flexure tests on sheet or strip materials, structural members such as tubing, angle, channel, and the like, or complete structural components such as beams, sandwich panels, stress skin panels, and the like or other test specimen. Such tests may have, but are not restricted to, the objective of determining any or a combination of the following (1) the maximum moment the test specimen is capable of withstanding; (2) a record of the deformation response of the specimen as moment is increased until failure occurs or until some smaller moment level is reached; (3) specimen stiffness, or the product of moment of inertia of the section about its neutral axis multiplied by the modulus of elasticity of the material in bending; and (4) the moment at the proportional limit or moment at which the specimen takes on a permanent, nonrecoverable deformation.

The established method of subjecting a portion of a flexure specimen to a pure bending moment is to load it as a beam at two points equidistant from the reactions thus producing a uniform bending moment between load points to the exclusion of shear. When deflections of the specimens are small this method proves satisfactory. However, when deflections become large as occurs when thin materials are tested over a relatively long span or when material properties are such as to permit large deformations before failure, difficulties arise from several causes: first, the load versus mid-span deflection curve is no longer theoretically linear, even at stress levels within the elastic range, causing proportional limits determined in the usual manner to be in error; second, forces are applied to the panel at an angle substantially different from the vertical requiring that these angles be measured and included in any accurate computation of bending moment; third, in order to keep deflections within limits which can be accommodated by any practical loading devices, it is sometimes necessary to use undesirably short spans; fourth, the standard equations for calculating modulus of elasticity in bending from load and deflection data are no longer theoretically correct since these equations assume small deflections, an assumption which permits certain simplifications in their derivations.

Reference to one of the many texts on strength of materials [1] will lead to a clearer understanding of the fourth point just enumerated. Such texts derive the fundamental relationship $R = EI/M$ where
$R$ = Radius of curvature at an originally straight point of the specimen or the change in radius of curvature as a result of the application of a bending moment at any point along the length of the specimen,
$EI$ = Product of moment of inertia of the cross section of the specimen about its neutral axis multiplied by the modulus of elasticity in bending of the specimen material, and
$M$ = Bending moment resisted by the specimen at that point. Derivation of deflection formulas for beams proceeds by substituting for the radius of curvature, $R$, its equivalent in rectangular coordinates $$\frac{(1+(dy/dx)^2)^{3/2}}{d^2y/dx^2}$$

In order to keep subsequent mathematical development within manageable limits of complexity, it is usually assumed that slopes are small and that the second order differential quantity $(dy/dx)^2$ may be neglected without incurring significant error leading to the differential equation $EI d^2y/dx^2 = M$.

This equation is then solved by the standard methods of double integration or the simpler moment-area approach.

Because of this simplification and the other sources of difficulty listed, significant errors occur when deflections exceed $1/40$ to $1/50$ of the span over which deflections are measured. These errors cause nonlinearity of the load-deflection curve unrelated to the lack of elastic behavior of the specimen making it impossible to accurately determine the proportional limit point. In more severe cases at deflections of about $1/10$ of span the deflection-load curve is so seriously influenced that it is impossible to accurately determine the fundamental modulus of elasticity in bending of the material.

My invention resulted from a need to overcome these problems when testing plywood panels large enough to represent the effects of sloping grain, knots, and other common defects. Examples of other, but not necessarily the only, applications are noted above. My device has the following specific objectives:

(1) The application of a pure bending moment to a large central portion specimen and the exclusion of other forces regardless of the extent of specimen deformation;

(2) The ability to conduct tests on long specimens throughout large deformations wherein the ends of the specimen may be rotated through 90 degrees or more;

(3) The measurement of applied moment directly in terms of inch-pounds or similar units;

(4) The application of moments in such a manner that the geometry of elastic deformation between points of moment application is theoretically predictable by simple formulas even when deformations are very large, thus facilitating computation of elastic properties of the specimen when proper deformation measurements are made;

(5) The measurement of deformation in terms of angular rotation occurring between two points on the specimen as the test progresses;

(6) The measurement of a deformation quantity of a large central portion of a bending specimen proportional to bending moment applied to the specimen, or other measured quantity proportional to stress applied to the specimen, when it is assumed that the specimen behaves according to Hook's law even though the actual magnitude of deformation may be very large, and which is related by simple formulae, unrestricted by simplifying assumptions of small deformations, to the fundamental elastic properties of the specimen, the latter being the product of Young's modulus and the cross section

[1] See for example, Marin and Sauer, "Strength of Materials," Second Edition, the Macmillan Co., 1954.

moment of inertia about the neutral axis of the specimen; and (7) The measurement of deformation and bending moment in such manner that the modulus of elasticity calculated from these quantities is the elastic modulus in pure bending and free of any influence of shear deformations.

It is obvious that apparatus fulfilling the objectives just enumerated will possess numerous advantages. Returning to the relationship $R=EI/M$, it is obvious that this relationship can be used directly to obtain specimen stiffness, or EI, and from it the fundamental modulus of elasticity in bending of the material of which the specimen is fabricated, since R is simply the distance between points of rotational deformation measurement divided by the angular rotation between these points. Since moment and rotational deformation are obtained directly and are theoretically linearly related so long as the specimen responds elastically to application of moment, none of the difficulties due to nonlinear curves are encountered and the method gives theoretically accurate results regardless of how sharp the radius or curvature may become.

The following describes a testing machine and instruments for the measurement of specimen deformation embodying the preferred methods for fulfilling these objectives.

FIGURES 1, 2, and 3 illustrate the principles of the cable and pulley system for applying bending moment to a test specimen and show the angular deformation measured by the deformation gages:

FIGURE 4 is a plan view of a complete unit, partly cut away, for applying the required bending moment to a specimen, the cable and pulley assembly and loading frames being inverted relative to their position in FIGURES 1 through 3;

FIGURE 5 is a side elevation, partly cut away, of the complete unit shown in FIGURE 4;

FIGURE 6 is a section view taken through A—A of FIGURES 4 and 5 showing the detail of the torque-measuring apparatus, track and carriage assembly, and the method of support of the loading frames;

FIGURE 7 is a side elevation, partly in section, showing the detail of one transducer for measuring angular displacement;

FIGURE 8 is an end elevation, partly in section, of a specimen panel, deformation gage, and supporting pin;

FIGURE 9 is an end elevation, partly sectional, showing further detail of the deformation gage shown in FIGURE 8.

Figure 1:
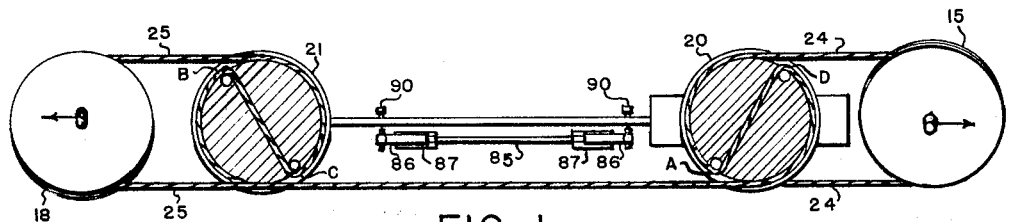
FIGURE 1 is a plan view of the essential features of the cable and pulley system and of the deformation gages attached to a specimen panel.

The flexure testing machine illustrated in the drawings consists of: (1) a frame for (a) supporting the various other assemblies and keeping them in proper relative position to one another and (b) resisting loads between other assemblies resulting from the bending of specimen panels; (2) a drive assembly for producing linear motion at a controlled but adjustable rate regardless of the force resisting such motion; (3) a cable and pulley assembly for (a) converting force produced by the drive assembly to two equal and opposite torques acting about two parallel axes, (b) precluding application of other forces by the cable and pulley assembly to the axes about which torque is applied, (c) permitting lateral motion of the axes about which torque is applied either directly toward each other or away from each other in response to other forces acting in the plane of the two axes and perpendicular to them; (4) a carriage and track assembly for (a) supporting the two torque pulleys, the loading frames, torque pick-up, and related components and maintaining their axes in a vertical and parallel position, (b) permitting the two torque pulleys and their related components, while so supported and oriented, to move with their axes in a vertical plane and always parallel to each other, (c) permitting such motion in response to very small lateral forces acting on the torque pulleys or loading frames, (d) providing a means of transmitting a small, relatively constant torque to the torque pulleys in a direction opposite to that applied by the cables and at the same time fulfilling the previously enumerated functions of the carriage and track assembly; (5) a counter-torque device for applying a small torque to each torque pulley tending to rotate each pulley in a direction opposite to that of the torque applied by the cables for the purpose of maintaining a small amount of tension on the cables at all times thus assuring their proper alignment in the grooves of all pulleys; (6) a torque-measurement assembly for accurately measuring torque applied by the cable and pulley assembly acting about the two axes; (7) a loading frame assembly for applying the two torques supplied by the cable and pulley assembly to the ends of specimens to be tested in flexure; and (8) a rotation-gage assembly for measuring deformation in terms of angular change between two points located on a line along the specimen perpendicular to the axes of torque application and on the portion of the specimen subject to a pure bending moment only, two essential features characterizing this method being (1) the exclusion of deformations due to shear and (2) the existence of simple engineering formulas relating deformation to elastic properties of the specimen regardless of the extent of deformation.

Frame

The frame may consist of any system of longitudinal and cross members suitable for rigidly holding the other assemblies in proper relative position and sustaining the required loads; hence the present frame (FIGURES 4 and 5) consists of two transversely spaced longitudinal channels 1 rigidly connected to cross members 2, 3, and 4.

Drive assembly

Any suitable means of producing relatively constant linear motion regardless of the force resisting such motion may be employed, such as a double acting hydraulic cylinder with suitable hydraulic pump and controls or a mechanical motor-driven assembly using suitable reduction gears followed by a screw or drum and cable arrangement to convert rotary motion to linear motion. In the present instance (FIGURES 4 and 5) a mechanical system using a screw is employed which comprises a variable speed, reversible direct-current motor 5 driving a suitable speed-reducing gear box 6 which in turn drives right hand screw 7 by means of sprockets 8 and 9 and chain 10. A second, left hand screw 11 is rotated in a direction opposite to right hand screw 7 by a gear 12 keyed to shaft of screw 7 which in turn drives gear 13 which is keyed to shaft of screw 11. Rotation of screws 7 and 11 produce horizontal linear motion of the crosshead 14. Both screws 7 and 11 rotate in bearings 110 which are capable of sustaining both radial and thrust loads. The reversible D.C. motor must be accompanied by the necessary controls to assure constant speed at any chosen preset value.

Cable and pulley assembly

Figure 2:
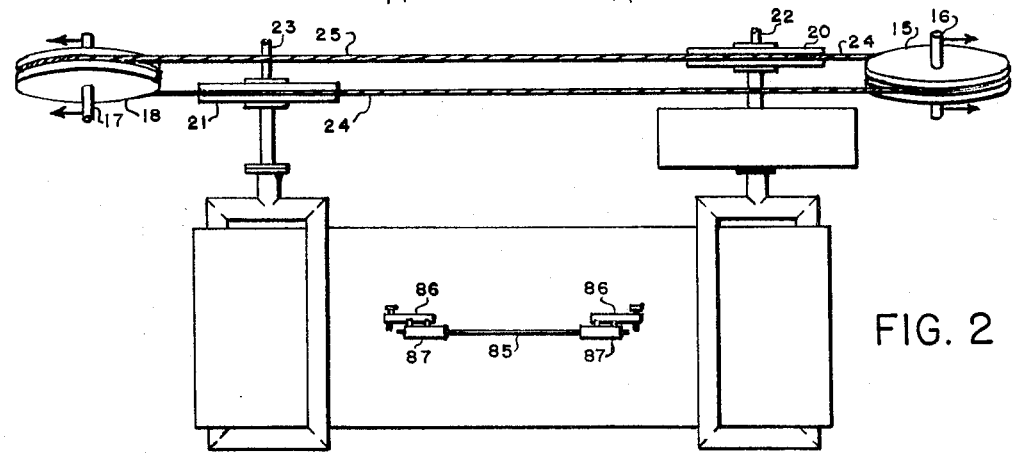
FIGURE 2 is a side elevation of the cable and pulley system and deformation gages shown in FIGURE 1.

The linear force applied to the crosshead 14 is converted to two equal and opposite torques by a cable and pulley assembly which may be most easily understood by referring to FIGURES 1 and 2 which show essential features only.

A crosshead pulley 15 is mounted with its axis at an angle to the vertical and lying in a plane perpendicular to the longitudinal axis of the machine. The shaft 16 of the crosshead pulley must rotate freely in bearings mounted in the crosshead 14. Transverse member 2 supports the shaft 17 of stationary pulley 18 in bearings 19 which permit the pulley and shaft to rotate freely. The axis of the shaft 17 lies in a plane perpendicular to the longitudinal axis of the machine and at an angle to the vertical equal to that of the crosshead pulley shaft 16 but in the opposite direction. The pitch diameters of the crosshead and stationary pulleys are equal. A right torque pulley 20 and left torque pulley 21 are rigidly fixed to their respective vertical shafts 22 and 23 at slightly different elevations. This vertical difference between the horizontal planes of the two torque pulleys is equal to the pitch diameter of the crosshead pulley 15 or stationary pulley 18 multiplied by the sine of the angle between the axis of either pulley shaft 16 or 17 and the vertical. The pitch diameter of the two torque pulleys 20 and 21 is equal to the pitch diameter of either the crosshead pulley 15 or the stationary pulley 18 mutiplied by the cosine of the angle between the axis of either the crosshead pulley shaft or stationary pulley shaft and the vertical.

FIGURES 1 and 2 show how two lengths of cable, or optionally a continuous loop of cable, are used to interconnect the four pulleys. The term "cable" as used in this application also includes any rope, solid wire or band possessing the necessary strength and flexibility. The first length 24 with one end anchored to the right torque pulley 20 at point A and the other end anchored to the left torque pulley 21 at point B passes around the crosshead pulley 15. Starting point A on torque pulley 20, this length of cable 24 follows the groove of torque pulley 20 in a clockwise direction for somewhat less than one-half turn, thence along a path tangent to torque pulley 20 and crosshead pulley 15, parallel to the longitudinal axis of the machine, and lying in the plane of the groove of torque pulley 20 to crosshead pulley 15, thence around crosshead pulley 15 for exactly one-half turn, thence along a path also parallel to the longitudinal axis of the machine but tangent to crosshead pulley 15 and left torque pulley 21 and lying in the plane of the groove of torque pulley 21, thence following the groove of left torque pulley 21 in a clockwise direction for slightly less than one-half turn to point B where the end is securely anchored to torque pulley 21. The straight paths of cable are parallel, lie in planes determined by the grooves of torque pulleys 20 and 21 by virtue of the slight inclination from the vertical of the axis of the crosshead pulley and its slightly larger diameter, as previously specified.

In a similar manner, one end of a second length of cable 25 is anchored at point C on left torque pulley 21 from which point the cable follows the groove of left torque pulley 21 in a counterclockwise direction for somewhat less than one half turn, thence following a path parallel to the longitudinal axis of the machine and tangent to the groove of both left torque pulley 21 and stationary pulley 17, thence around stationary pulley 17 in a counterclockwise direction for exactly one-half turn, thence along a path lying in the plane determined by the groove of right torque pulley 20, tangent to stationary pulley 17 and right torque pulley 20, and parallel to the longitudinal axis of the machine, thence following the groove of right torque pulley 20 in a counterclockwise direction to point D where its other end is anchored to right torque pulley 20.

An alternative to using any suitable means of anchoring the cables at points A, B, C, and D is to pass the cable diametrically through torque pulleys 20, and 21 from points A to D and B to C respectively through a hole provided so that a single continuous loop of cable is formed as shown in FIGURE 1. The splice used to form this closed loop may be placed in the hole through either torque pulley.

Figure 10:
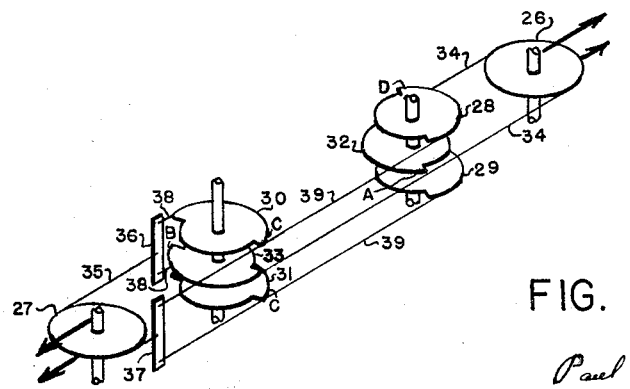
FIGURE 10 is a diagrammatic perspective view of a less preferred, but workable cable and pulley system.

A feasible alternative cable and pulley assembly, less preferred than that just described, is illustrated in FIGURE 10 which permits the axes of crosshead pulley 26 and stationary pulley 27 to be vertical and parallel, the grooves of both pulleys to lie in the same horizontal plane, and all pulleys and pulley segments to be of the same radius. The right and left torque pulleys are comprised of three segments 28, 29, 32 and 30, 31, 33 respectively, all rigidly attached to their shafts. One end of a length of cable 34 is attached to the middle segment 32 of the right torque pulley at point A from which the cable passes clockwise around segment 32 for less than one-half turn, thence to crosshead pulley 26, around crosshead pulley 26 for one-half turn, thence to the middle segment 33 of the left torque pulley, thence clockwise around segment 33 to point B where its other end is anchored. The cable 34, crosshead pulley 26, and middle pulley segments 32 and 33 all lie in the same horizontal plane. A short length of cable 35 passes around stationary pulley 27 having ends attached to the center of vertical bars 36 and 37. Attached to the top and bottom ends of vertical bar 36 are the ends of cables 38 which follow a path to and around top and bottom segments 30 and 31 respectively of the left torque pulley to points C where the other end is anchored. Similarly, cables 39 are attached at one end to the ends of vertical bar 37 from which they follow a path to and counterclockwise around top and bottom segments 28 and 29 respectively of the right torque pulley where the other end is anchored at points D.

*Carriage and track assembly*

Figure 4:
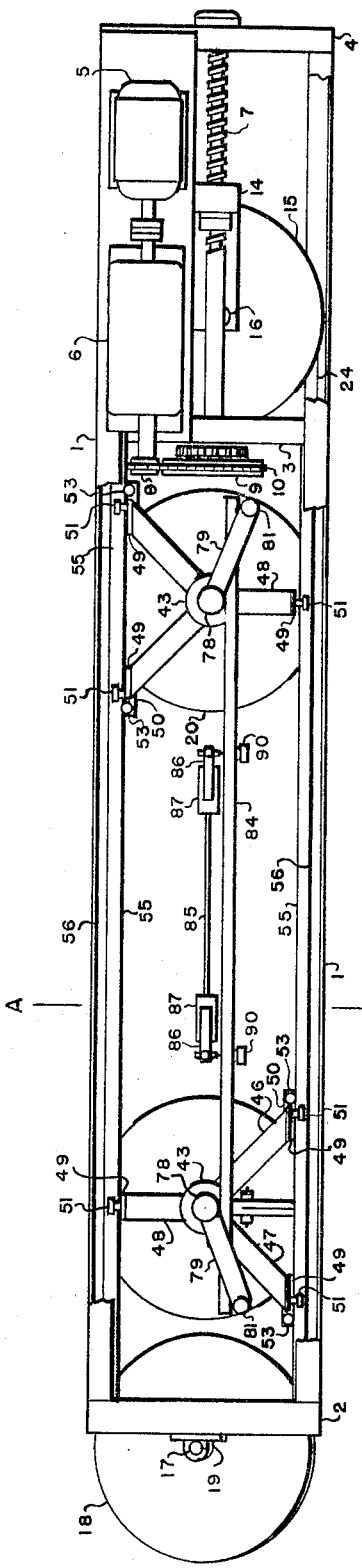
FIGURES 4 through 9 illustrate a flexure testing machine and deformation gages fulfilling the objectives listed above and constructed in accordance with my invention.
Figure 6:
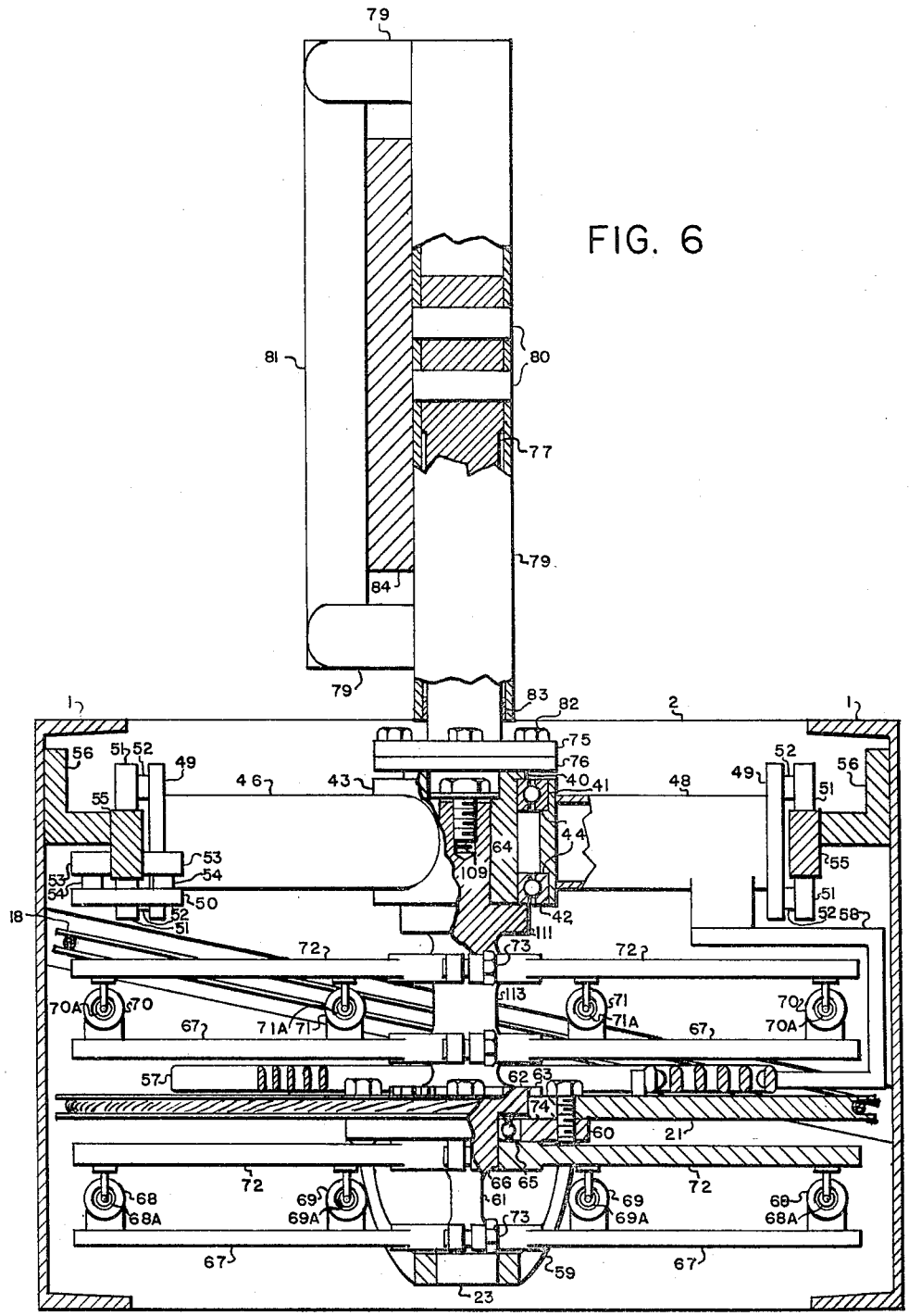

FIGURES 4 and 6 provide the best views of the carriage and track assembly. A hub 64 of left torque pulley 21 provided with shoulder 40 is supported in a vertical position and is free to rotate in a carriage assembly which comprises bearings 41 and 42 mounted in cylindrical housing 43 provided with internal shoulder 44 to provide vertical support for bearing 41 and hub 64, arms 46, 47 and 48 rigidly joined to housing 43 vertical plates 49 rigidly attached to ends of arms 46, 47 and 48, horizontal plates 50 rigidly attached to ends of arms 46 and 47, ball bearings 51 with inner races mounted on shafts 52 which are rigidly fixed to vertical plates 49, and ball bearings 53 with inner races mounted on shafts 54 rigidly attached to horizontal plates 50. An upper flange 111 of torque pulley shaft 23 is drawn against the lower face of bearing 42 by screw 109 which supports the torque pulley 21 and the torque-measurement assembly. External splines on the upper end of shaft 23 mate with internal splines of hub 64 and transmit torque to hub 64, and thence to the left loading frame to which it is attached. The tracks consist of two longitudinal rectangular bars 55 having smooth vertical and horizontal surfaces, rigidly mounted on brackets 56 which are rigidly fixed to longitudinal members 1 of the frame.

*Counter-torque assembly*

The counter torque assembly comprises a flat coiled spring 57 with its coils lying in a horizontal plane having one end fastened to bracket 58 which is rigidly attached to carriage arm 48 and the other end fastened to torque pulley 21. Spring 57 is coiled to apply sufficient torque to torque pulley 21 in a direction opposite to that applied by the cables to keep the cables constantly under a small amount of tension. A similar assembly applies an equal but opposite torque to right torque pulley 20.

*Torque-measurement assembly*

In the case of the shaft 23 of left torque pulley 21, the shaft 23 also functions as part of the torque measurement assembly and is fabricated from a material possessing the necessary elastic properties. One end of shaft 23 is rigidly held in and transmits torque to hub 64 by means of external splines which mate with internal splines of hub 64 and is supported vertically by cap screw 109 which draws flange 111 of shaft 23 against the lower end of hub 64 and bearing 42. The other end is rigidly held in the small end of bell housing 59 which is provided with a flange 60 at its larger end to which is rigidly bolted left torque pulley 21. A ball bearing 65 keeps flange 60 of bell housing 59 centered on, and free to rotate about shaft 23. Shaft 23 is provided with a section 61 for measurement of low moments and section 113 for measurement of high moments. At both ends of each moment-measuring section 61 and 113 rounded fillets 66 provide a gradual transition of shaft diameter to flanges to which are clamped arms 67 on which are mounted coils 68, 69, 70, and 71 of linear transformers 68, 69, 70, and 71 and arms 72 on which are mounted the corresponding armatures 68a, 69a, 70a and 71a of these same transformers. Clamping of arms 67 and 72 to flanges is by means of cap screws 73. Overloading of the low moment-measuring section 61 is prevented by internal lugs 74 on torque pulley 21 which contact external lugs 63 on flange 62 of shaft 23 when the capacity of the low range moment-measuring section is reached. Additional moment is transmitted directly through these lugs 63 and 74 to the lower end of the high range moment measuring section 113 without being transmitted through bell housing 59 and low range moment-measuring section 61. Application of twisting moment to shaft 23 causes arms 67 to rotate slightly and proportionately about the axis of shaft 23 with respect to arms 72 which in turn causes the armatures 68a, 69a, 70a, and 71a of the linear transformers to be displaced relative to their coils which displacement results in a corresponding electrical signal when said linear transformers are incorporated into appropriate circuitry of suitable indicators or recorders which indicate or record moment transmitted by shaft 23. Each pair of transformer coils 68, 69, 70, and 71 is wired to add displacements and provide four ranges for the measurement of moment from low to high in that order.

No measurements are made at right torque pulley 20; instead, right torque pulley 20 is bolted directly to a flange at one end of a short right torque pulley shaft which is rigidly connected at its other end to a hub similar to hub 64 in a manner identical to that indicated for shaft 23.

*Loading frame assembly*

The loading frame assembly comprises a shaft 77 connected at one end by an integral flange 75 and cap screws 82 to flange 76 of hub 64 and a tubular frame made up of outer tube 78, arms 79, and loading bar 81 all rigidly joined. Shaft 77 transmits moment to outer tube 78 midway between arms 79 by pins 80 or other suitable means. A bushing 83 keeps the outer tube 78 in alignment with shaft 79 at its lower end and allows tube 78 to turn slightly around shaft 77 as it deforms due to applied moment. Moment is transmitted to outer tube 78 midway between arms 79 in order to assure symmetrical deformation of the tubular frame under load and sharing of load equally between arms 79, thus loading the specimen panel 84 or other specimen uniformly across its width.

*Rotation gage assembly*

The rotation gage assembly comprises a reference rod 85, rotation gages 86 from which references rod 85 is suspended by sleeves 87, and pins 88 which are inserted through holes drilled in the specimen 84 and support rotation gages 86.

A flange 89 is rigidly attached to pin 88 and a nut 90 threaded onto the end of pin 88 which protrudes through test specimen 84 holds the pin rigidly to the specimen during test and approximately at right angles to the plane tangent to the test specimen at that point.

The rotation gage comprises a tube 91 which is supported by vertical shaft 92 held in ball bearings 93 having cross bar 94 rigidly attached to its lower end and separated from lower ball bearing 93 by sleeve 95, said cross bar 94 having V plates 96 attached rigidly to each end which rest on pin 88; and sleeve 87 suspended from tube 91 by plates 97 provided with a hole through which tube 91 passes and a saw cut from the top edge of the plate into said hole permitting clamping of plate 97 to tube 91 by means of screws 112, each plate 97 being provided with three ball bearings 98 which support reference rod 85 while permitting rotation gage 86 to slide freely along reference rod 85 but always keeping the axis of tube 91 parallel to reference rod 85. Sleeve caps 99 and screws 100 clamp plates 97 rigidly to sleeve 87.

Figure 3:
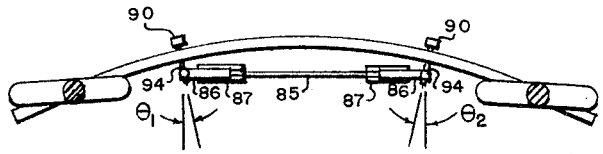
FIGURE 3 is a plan view with the cable and pulley system removed of a specimen panel to which a bending moment has been applied by the loading frames showing the angular deformation measured by the deformation gages.
Figure 7:
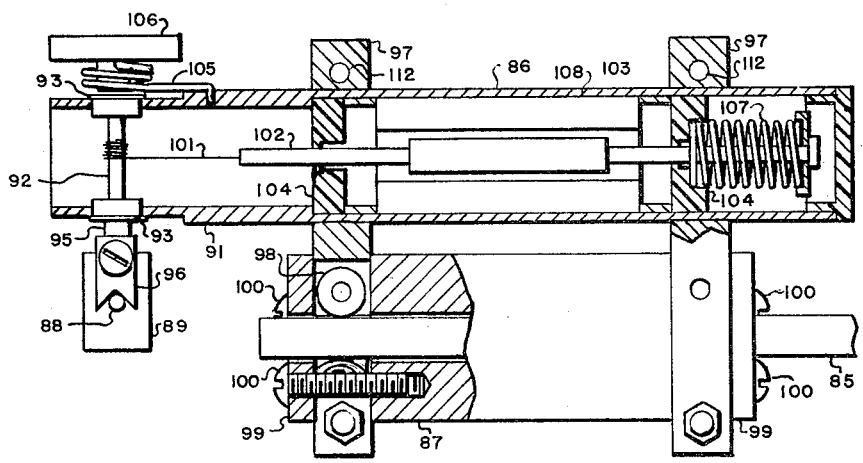
Figure 9:
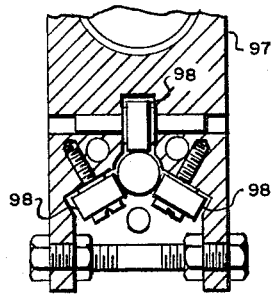
Figure 8:
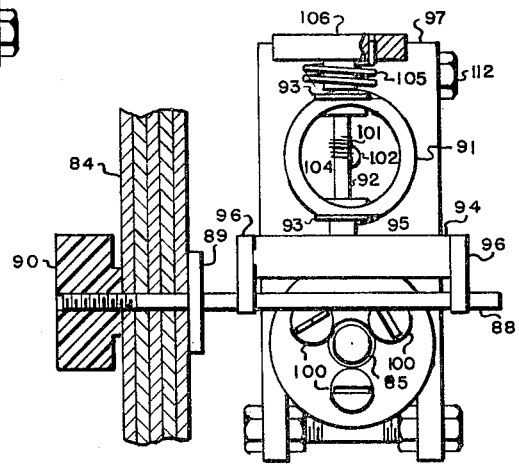

Bending of specimen panel 84 causes rotation of pin 88 through angle $\theta_1$ in FIGURE 3, causing shaft 92 (shown in FIGURES 7 and 8) to rotate which rotary motion is converted to proportional linear motion by a very small diameter, stranded steel wire 101 secured at one end to shaft 92, wound several times around shaft 92 and secured at its other end to the end of linear transformer armature shaft 102 on which is mounted armature 103, shaft 102 being supported by, and free to slide lengthwise in, bushings 104. Steel wire 101 is maintained under constant tension by spring 105 which applies a twist to shaft 92 through knob 106 mounted rigidly on end of shaft 92 to which one end is anchored, the other end being anchored to tube 91, which twist tends to wind additional wire 101 onto shaft 92 this tendency being opposed by compression spring 107. By use of relatively low modulus springs and proper balancing, springs 105 and 107 keep wire 101 under considerable tension while minimizing restraint by springs 105 and 107 to rotation of shaft 92. Relative motion of armature 103 in linear transformer coil 108 is translated into a proportional electrical signal by the coil which is added by appropriate electrical circuitry to the electrical signal from the other rotation gage. The electrical sum of the outputs from the two rotation gages may be indicated by any suitable device or plotted against bending moment measured by the moment-measuring assembly by an X-Y recorder. The test data so recorded permit determination of strength and elastic properties of the test specimen.

*Operation*

Figure 5:
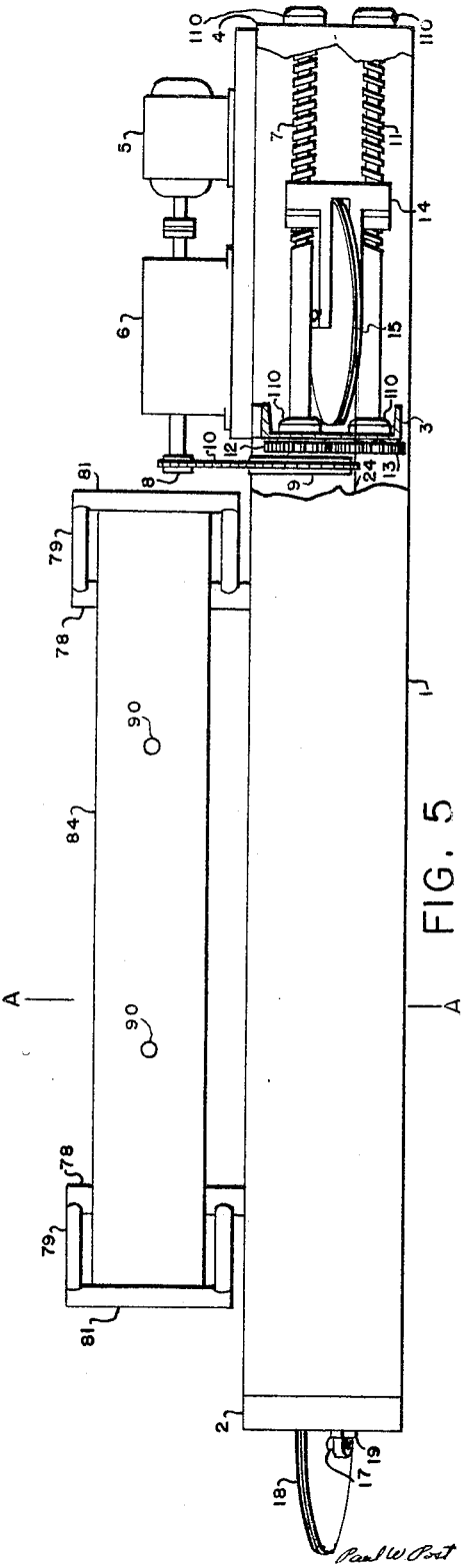

Operation of the machine in the carrying out of a test will be obvious from the foregoing. It will suffice here to set forth the steps required for the conduct of a typical test and to ready the equipment for a subsequent test as follows: (*a*) the test specimen having holes to receive pins 88 previously drilled at the proper locations is placed in the loading frames as indicated in FIGURES 4 and 5; (*b*) the crosshead 14 is moved to the right until all four loading bars of the loading frames are just contacting the specimen; (*c*) the pins 88 are inserted in the previously prepared holes in the specimen and the pin nut 90 is turned down snugly against the panel to assure rigid attachment of pin 88; (*d*) the remaining components of the rotation gage assembly consisting of the gages, sleeves, and reference rod are placed on and supported by the pins; (*e*) any necessary zeroing adjustments are made so that both moment and deflection indicators and/or recording equipment read zero at the start of the test; (*f*) the controls of the variable speed motor 5 are set to give the desired rate of crosshead motion and the corresponding rate of straining of the extreme fiber of the test specimen; (*g*) the motor is turned on at this rate moving the crosshead to the right and flexing the specimen in a manner shown in FIGURE 3 until either (1) sufficient moment and deflection data are obtained to enable calculation of elastic properties or, if strength as well as elastic properties are desired, until (2) the specimen breaks; (*h*) the motor is reversed and the speed controls reset to propel the crosshead at a high rate of travel to the left until the loading frames are again in a position to receive a test specimen; and (i) while the loading frames are being returned to their original position, the rotation gage assembly is removed from the panel and the tested panel removed from the machine. When testing materials which typically break suddenly and violently, it may be desirable to remove the rotation gages from the specimen shortly before anticipated failure in order to preclude possible damage. The well known formulas relating angular rotation and applied moment to specimen rigidity and strength are readily applied to the data to obtain such properties as modulus of rupture, modulus of elasticity, stress at proportional limit and strain energy at various stress levels. For the last two properties, use of an X–Y recorder for plotting moment and deflection as the test progresses is much to be preferred to indicating equipment.

The operation of the various assemblies as the test commences with (g) above will be apparent from the foregoing discussion of the various assemblies and will be reviewed here only briefly. The drive assembly propels the crosshead 14 to the right at a constant rate of motion resulting in a uniform tensile force throughout the length of cable 24 and 25, which is assured first by the freedom of crosshead pulley 15 and stationary pulley 18 to turn in their bearings and second by freedom of motion provided by the carriage and track assembly permitting the torque pulleys 20 and 21 to move in a direction parallel to the longitudinal axis of the machine. The result of the equal tensile force throughout cables 24 and 25 is that equal but opposing torques are applied to torque pulleys 20 and 21 which is in turn transmitted to the loading frames and applied by them to the ends of the test specimen. As the specimen flexes under increasing applied moment, as indicated in FIGURE 3, the right loading frame rotates in a counterclockwise direction; and the two loading frames approach each other at an increasing rate as the curvature of the specimen becomes smaller. It should be pointed out that the loading frames of the more advanced machine shown in FIGURE 4 rotate in the opposite direction during test; that is, the right loading frame nearest the crosshead rotates counterclockwise and the left loading frame rotates clockwise. Also, as the panel flexes, the gage pins 88 rotate through angles $\theta_1$ and $\theta_2$ as indicated in FIGURE 3 causing the rotation gages 86 to move toward each other along the reference rod 85 being guided in such motion by bearings 98 of sleeve 87. The rotation gages produce an electrical output proportional to the change in the angle between reference rod and pin at each gage. The sum of these two electrical signals is obtained by appropriate circuitry of primary and secondary winding of linear transformer coils 108. This sum is proportional to the sum of angles $\theta_1$ and $\theta_2$ and is plotted on one axis of an X–Y recorder or indicated in some other manner, from which, by use of an appropriate proportionality constant, the sum of angles $\theta_1$ and $\theta'$ may be calculated. Simultaneously, an electrical signal proportional to the torque applied by the loading frames is obtained from the linear transformers 68, 69, 70, or 71 of the torque-measuring assembly, depending upon the range desired, and plotted on the other axis of the X–Y recorder or otherwise indicated. Relative displacement of the armatures within the coils results from slight twisting of the torque bars 61 and 64 as applied moment increases.

When crosshead motion is reversed after completion of a test to return crosshead and loading frames to their original position, coiled spring 57 and a similar spring on the right carriage, which were tightened slightly by rotation of the load frames during test, apply sufficient reverse torque to rotate the loading frames back to their original position and keep sufficient tension on the cables 24 and 25 to prevent their becoming slack and coming out of their respective pulley grooves.

The invention has been described with respect to a preferred embodiment. It is apparent, however, that modifications may be made by those skilled in the art without departing from the scope of the invention as embodied in the appended claims.

I claim:

1. A cable and pulley system comprising: a middle pair of pulleys of equal diameter DM, having spaced parallel axes of rotation and having the planes determined by their respective pulley grooves spaced by a distance D; an outer pair of pulleys of equal diameter DO, having (1) axes of rotation passing through, and the plane of its groove containing, a reference line defined as passing through the axes of rotation of the middle pair of pulleys and parallel to, and midway between, the planes determined by the grooves of the middle pair of pulleys, the intersection points of the outer pulley axes with the reference line being so spaced on the reference line that the intersection points of the middle pulleys lies between them, and having their axes of rotation inclined by some definite angle A, greater than zero and less than 90 degrees in opposite directions from the plane determined by the axes of the middle pair of pulleys, the relationship between the DM, DO, D, and A being such that DM and D form the legs and DO the hypotenuse of a right triangle; a first length of cable having its bight passing around one of the outer pulleys for one half turn and having one end attached to one of the middle pulleys and the other end attached to the other middle pulley; a second length of cable having its bight passing around the other of the outer pulleys and also having one end attached to one of the middle pulleys and the other end attached to the other middle pulley, both lengths of cable having all straight runs of cable between pulleys parallel to the reference line and both lengths of cable passing around their respective outer pulleys on the side away from the other pulleys, and the portion of each cable adjacent to each end following the groove of the middle pulley to which it is attached for some positive central angle between 0 and 180 degrees from the point of tangency of the straight run of cable between middle and outer pulley and its point of attachment to the middle pulley.

2. A flexure test machine comprising a force producing means connected to a cable and pulley system which converts the force to two equal opposite torques acting about parallel axes, torque measurement apparatus mounted on one torque axis, loading frames mounted on both torque axes for applying torques to a flexure specimen, carriages and tracks supporting the torque axes in parallel orientation, free to turn and move laterally in their plane, and a frame to which the force producing means, one end of the cable and pulley system, and tracks are attached and held in proper relative position.

3. A flexure testing machine incorporating the cable and pulley system of claim 1 comprising; a frame at one end of which the shaft of one outer pulley is mounted in bearings, the other end having rigidly attached to it a means of moving the shaft of the other outer pulley, also free to turn in bearings, along the reference line of the cable system, and having rigidly attached to it tracks oriented parallel to the reference line of the cable system along which two carriages are free to move, said carriages supporting the shafts of the middle pulleys in their required parallel orientation according to claim 1, and loading frames rigidly attached to the shafts of the middle pulleys which apply moment to the test piece.

4. The flexure test machine of claim 3 wherein a torque measurement assembly is added to one torque axis between pulley and loading frame.

5. The flexure test machine of claim 2 wherein two torque measurement apparatuses are added one to each torque axis between their respective middle pulleys and their loading frames.

6. The flexure test machine of claim 3 wherein two torque measurement apparatuses are added one to each torque axis between the respective middle pulleys and their loading frames.

References Cited by the Examiner

UNITED STATES PATENTS

| | | | |
|---|---|---|---|
| 581,937 | 5/1897 | Kinsey | 220—52 |
| 2,663,085 | 12/1953 | Ruge | 33—147 |
| 2,745,280 | 5/1956 | Conaway | 73—100 |
| 2,754,681 | 7/1956 | Gregg et al. | 73—100 |
| 2,833,045 | 5/1958 | Strimel | 33—147 |
| 3,026,720 | 3/1962 | Hill et al. | 73—100 |

RICHARD C. QUEISSER, *Primary Examiner.*

DAVID SCHONBERG, *Examiner.*

E. P. FORGRAVE, G. M. GRON, *Assistant Examiners.*